United States Patent
Oba et al.

(10) Patent No.: US 12,410,325 B2
(45) Date of Patent: Sep. 9, 2025

(54) DECORATIVE LAMINATE INCLUDING METALLIC LAYER AND METHOD FOR PRODUCING THE SAME, AND METALLIC COATING COMPOSITION

(71) Applicant: 3M INNOVATIVE PROPERTIES COMPANY, St. Paul, MN (US)

(72) Inventors: Tomohiro Oba, Yamagata (JP);
Shinsuke Kondo, Yamagata (JP);
Naota Sugiyama, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 14 days.

(21) Appl. No.: 18/038,471

(22) PCT Filed: Dec. 15, 2021

(86) PCT No.: PCT/IB2021/061791
§ 371 (c)(1),
(2) Date: May 24, 2023

(87) PCT Pub. No.: WO2022/130252
PCT Pub. Date: Jun. 23, 2022

(65) Prior Publication Data
US 2024/0010849 A1 Jan. 11, 2024

(30) Foreign Application Priority Data
Dec. 18, 2020 (JP) .................. 2020-210629

(51) Int. Cl.
C09D 5/20 (2006.01)
C08K 3/08 (2006.01)
(Continued)

(52) U.S. Cl.
CPC .................. C09D 5/20 (2013.01); C08K 3/08 (2013.01); C09D 7/61 (2018.01); C09D 7/69 (2018.01);
(Continued)

(58) Field of Classification Search
CPC .............. C08K 3/08; C08K 2003/0812; C08K 2201/003; B32B 2255/10;
(Continued)

(56) References Cited

U.S. PATENT DOCUMENTS 10,632,498 B2    4/2020  Fujiwara
2007/0237929 A1  10/2007 Suga
(Continued)

FOREIGN PATENT DOCUMENTS

JP    H05-111991 A    5/1993
JP    H10-244213 A    9/1998
(Continued)

OTHER PUBLICATIONS

International Search report for PCT International Application No. PCT/IB2021/061791, mailed on Mar. 1, 2022, 3 pages.

*Primary Examiner* — Hai Y Zhang

(57) ABSTRACT

A decorative laminate includes a metallic layer that has excellent metallic glossiness and can reduce or prevent appearance failure, and a method of producing the same, and a metallic coating composition that can form the metallic layer. A decorative laminate includes: at least one selected from the group consisting of a substrate and a release liner; and a metallic layer containing metal pigment particles and a binder, the metal pigment parciles having a particle diameter D50 of from approximately 5 to approximately micrometers and a particle diameter D90 of from approximately 10 to approximately 30 micrometers, the metallic layer having an L* value of approximately 85 or greater.

7 Claims, 7 Drawing Sheets

(51) Int. Cl.
*C09D 7/40* (2018.01)
*C09D 7/61* (2018.01)
*C09D 133/14* (2006.01)

(52) U.S. Cl.
CPC .... *C09D 133/14* (2013.01); *C08K 2003/0812* (2013.01); *C08K 2201/005* (2013.01)

(58) Field of Classification Search
CPC . B32B 2255/205; B32B 2451/00; B32B 7/12; B32B 27/10; B32B 27/36; B32B 29/00; B32B 2307/402; B05D 1/28; B05D 5/067; B05D 7/04; C09D 5/38; C09D 127/06; C09D 5/20; C09D 7/61; C09D 7/69; C08F 214/06
See application file for complete search history.

(56) References Cited

U.S. PATENT DOCUMENTS

| | | | |
|---|---|---|---|
| 2017/0275497 | A1* | 9/2017 | Kuroda .................... C09D 1/00 |
| 2019/0338134 | A1 | 11/2019 | Hamm et al. |

FOREIGN PATENT DOCUMENTS

| | | |
|---|---|---|
| JP | H11-152423 A | 6/1999 |
| JP | 2007261143 A | 10/2007 |
| JP | 2010100051 A | 5/2010 |
| JP | 2014031214 A | 2/2014 |
| JP | 2016155945 A | 9/2016 |
| JP | 2018095741 A | 6/2018 |
| WO | 2011101455 A1 | 8/2011 |
| WO | 2015099151 A1 | 7/2015 |
| WO | 2018110635 A1 | 6/2018 |
| WO | 2019131957 A1 | 7/2019 |

* cited by examiner

DECORATIVE LAMINATE INCLUDING METALLIC LAYER AND METHOD FOR PRODUCING THE SAME, AND METALLIC COATING COMPOSITION

TECHNICAL FIELD

The present disclosure relates to a decorative laminate including a metallic layer and a method of producing the same, and a metallic coating composition.

BACKGROUND ART

In recent years, for example, decorative sheets having a metallic design have been developed and used in a wide variety of fields, such as interior products or exterior products.

Patent Document 1 (JP 2010-100051 A) describes a decorative sheet formed by sequentially laminating at least a covering layer, a metallic layer, and a surface-protecting layer on a base material, a content proportion of a glittering pigment contained in the metallic layer being from 15 to 45 parts by mass per 100 parts by mass of a resin solid content of the metallic layer, the surface-protecting layer being formed by crosslinking and curing an ionizing radiation-curable resin composition, and a coating amount of the ionizing radiation-curable resin composition being from 3 to 8 g/m$^2$.

Patent Document 2 (JP 05-111991 A) describes a decorative sheet formed by providing an acrylate-based emulsion layer containing aluminum particles having a scale-like shape and having a smooth surface, on an underlying layer.

SUMMARY OF INVENTION

Technical Problem

The decorative sheets described in Patent Documents 1 and 2 each have a metallic layer formed by using a glittering pigment such as aluminum particles. Such a known metallic layer formed on the decorative sheet like those described above typically exhibits a shiny design, such as glitter, and does not exhibit metallic gloss that can be imparted by a metal itself.

For the metal gloss, for example, by forming a metal vapor deposition layer on a base material, metallic glossiness imparted by metal itself will be exhibited. However, a metal vapor deposition layer tends to cause cracking when stretched or bent and thus tends to have reduced metallic gloss compared to a metallic layer formed by using a glittering pigment, and thus may cause appearance failure.

The present disclosure provides a decorative laminate including a metallic layer that has excellent metallic glossiness and can reduce or prevent appearance failure, and a method of producing the same, and a metallic coating composition that can form the metallic layer.

Solution to Problem

One embodiment of the present disclosure provides a decorative laminate including: at least one selected from the group consisting of a substrate and a release liner; and a metallic layer containing metal pigment particles and a binder, the metal pigment particles having a particle diameter D50 of from approximately 5 to approximately 25 micrometers and a particle diameter D90 of from approximately 10 to approximately 30 micrometers, the metallic layer having an L* value of approximately 85 or greater.

Another embodiment of the present disclosure provides a method of producing the decorative laminate, the method including, while applying shear to a surface of a metallic coating composition containing the metal pigment particles described above and a binder precursor, applying the metallic coating composition onto a substrate for forming a metallic layer.

Yet another embodiment of the present disclosure provides a metallic coating composition containing: metal pigment particles having a particle diameter of D50 of from approximately 5 to approximately 25 micrometers and a particle diameter D90 of from approximately 10 to approximately 30 micrometers; and a binder precursor, wherein the metallic coating composition is applied onto a substrate while shear is applied to a surface of the metallic coating composition.

Advantageous Effects of Invention

The present disclosure can provide a decorative laminate including a metallic layer that has excellent metallic glossiness and can reduce or prevent appearance failure, and a method of producing the same, and a metallic coating composition that can form the metallic layer.

The above description should not be construed as disclosing all embodiments of the present invention and all advantages relating to the present invention.

DESCRIPTION OF EMBODIMENTS

Figure 1B:
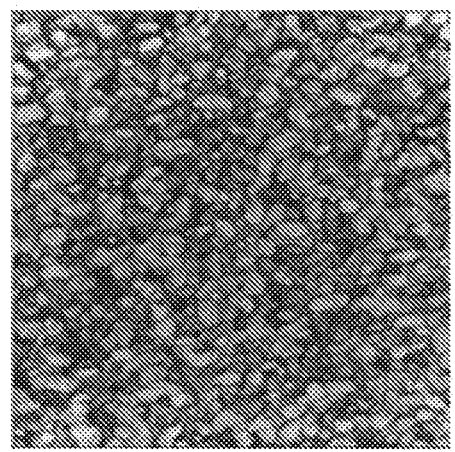
FIG. 1(b) is a laser micrograph (magnification: 50 times) of a metallic layer in the laminate of Example 1.

Hereinafter, representative embodiments of the present invention will be described in more detail with reference to the drawing, as necessary, for the purpose of illustration, but the present invention is not limited to these embodiments. Regarding the reference numbers in the drawings, constituents labeled with similar numbers across different drawings are similar or corresponding constituents.

In the present disclosure, the term "film" encompasses articles referred to as "sheets".

In the present disclosure, the term "on", for example used in "a metallic layer is disposed on a substrate", means that the metallic layer is disposed directly on the upper side of the substrate, or that the metallic layer is indirectly disposed on the upper side of the substrate via other layers.

In the present disclosure, the term "under", for example used in "an adhesive layer is disposed under the substrate" means that the adhesive layer is disposed directly under the lower side of the substrate, or that the adhesive layer is indirectly disposed under the lower side of the substrate via other layers.

In the present disclosure, the term "metal pigment particles" means particles that can impart a metallic design in the metallic layer. Note that the term "metallic design" does not refer to a design like shiny glitter or a design such as so-called flip-flop property by which hue is changed depending on the angle of viewing, but means a design that has metallic gloss that can be exhibited by a metal itself.

In the present disclosure, the term "metallic layer" means a layer that can exhibit a metallic design.

In the present disclosure, the term "substantially" means that a variation caused by a production error or the like is included, and is intended to allow a variation of approximately ±20%.

In the present disclosure, the term "transparent" refers to an average transmittance in the visible light region (wavelength of 400 nm to 700 nm) measured in accordance with JIS K 7375 of approximately 80% or greater, and the average transmittance may be desirably approximately 85% or greater or approximately 90% or greater. The upper limit of the average transmittance is not particularly limited, and can be, for example, less than approximately 100%, approximately 99% or less, or approximately 98% or less.

In the present disclosure, the term "translucent" refers to an average transmittance in the visible light region (wavelength of 400 nm to 700 nm) measured in accordance with JIS K 7375 of less than approximately 80%, and the average transmittance may be desirably approximately 75% or less, and is intended not to completely hide an underlying layer.

In the present disclosure, the term "(meth)acrylic" refers to acrylic or methacrylic, and the term "(meth)acrylate" refers to acrylate or methacrylate.

Hereinafter, the decorative laminate of the present disclosure will be described with reference to the drawings as necessary.

Figure 1A:
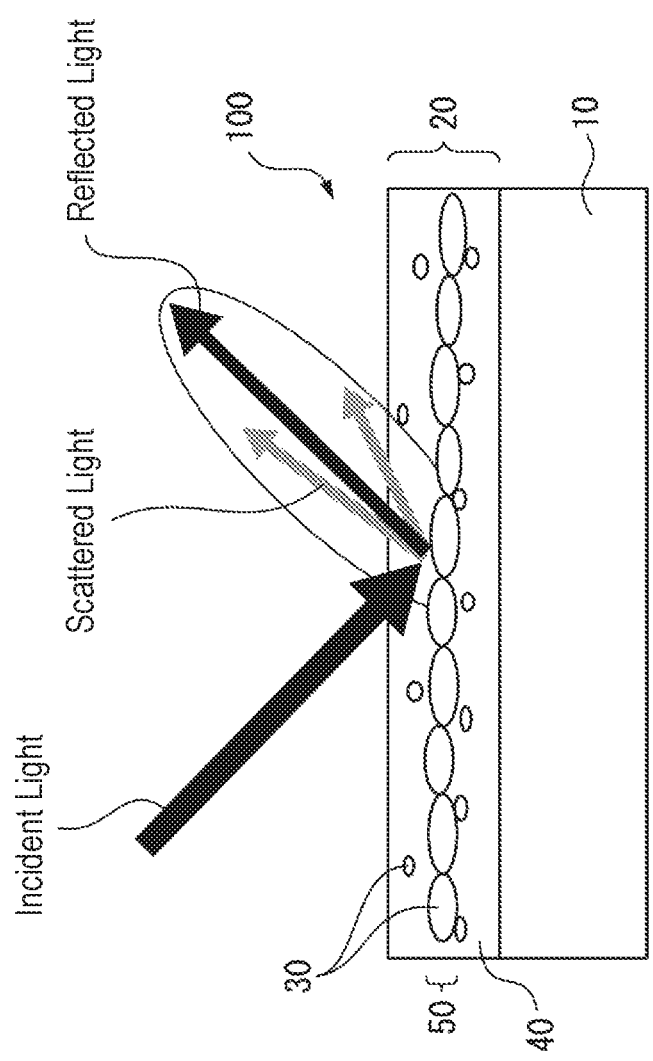
FIG. 1(a) is a diagram schematically illustrating a cross section of a laminate of Example 1, which is an embodiment of the present disclosure.

A decorative laminate 100 in FIG. 1(a) includes a substrate 10 and a metallic layer 20.

Hereinafter, for the purpose of illustrating representative embodiments of the present disclosure, details of each component will be described with some reference signs omitted.

The decorative laminate of the present disclosure (sometimes referred to simply as "laminate") includes a metallic layer containing metal pigment particles having a particle diameter D50 of from approximately 5 to approximately 25 micrometers and a particle diameter D90 of from approximately 10 to approximately 30 micrometers, and a binder. The metallic layer may take a single layer structure or a multilayer structure.

Figure 4:
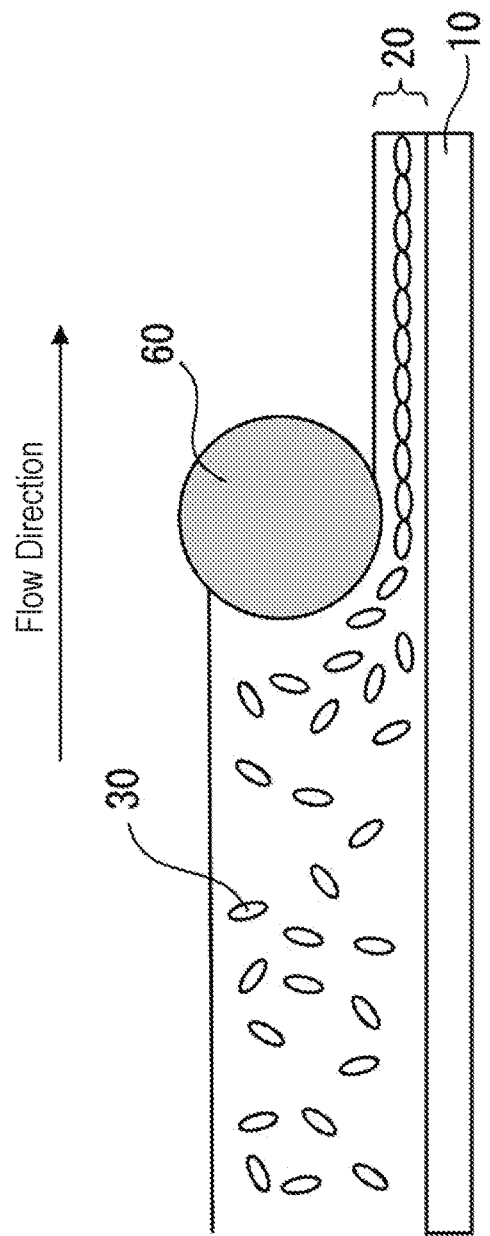
FIG. 4 is a schematic view illustrating a step of applying a metallic coating composition onto a substrate, while applying shear to a surface of the metallic coating composition using a bar coater, for forming a metallic layer.

The metallic layer of the present disclosure contains the particular metal pigment particles described above. The metallic layer containing such particles is formed by a shear-applying method (e.g., a bar coater). For example, as illustrated in FIG. 4, when a metallic coating composition containing metal pigment particles and a binder precursor is applied onto the substrate 10, while shear is applied to a surface of the metallic coating composition with a bar coater 60, metal pigment particles 30 randomly oriented in the metallic coating composition tend to be oriented in a flow direction. Among the metal pigment particles, the metal pigment particles of the present disclosure have a relatively narrow particle size distribution and contain a large amount of particles having a medium particle diameter, and thus are easily oriented so as to be uniformly aligned in the flow direction without gaps, as illustrated in FIG. 1. As a result, a surface of a metal pigment particle layer 50 containing the metal pigment particles 30 formed in the metallic layer 20 exhibits a uniform surface roughness, like a glossy surface of a metal itself, and the effect of scattering of incident light at the surface is reduced. Therefore, the metallic layer of the present disclosure can exhibit a good metallic gloss.

Figure 2B:
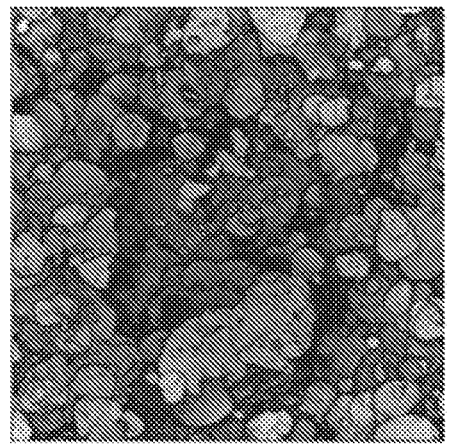
FIG. 2(b) is a laser micrograph (magnification: 50 times) of a metallic layer in the laminate of Comparative Example 1.
Figure 2A:
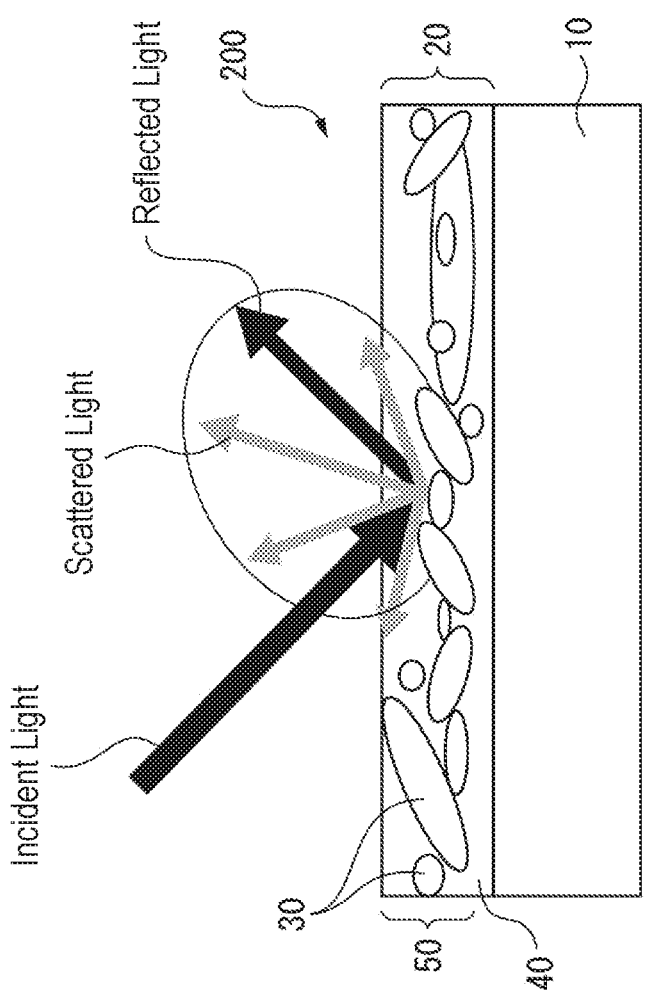
FIG. 2(a) is a diagram schematically illustrating a cross section of a laminate of Comparative Example 1.

FIG. 2(a) is a model diagram of a case where metal pigment particles having a wider particle size distribution than that of the metal pigment particles of the present disclosure and containing a large amount of particles having a medium to large particle diameter. It is inferred that, if the metal pigment particles are used to form a metallic layer while shear is applied, the surface roughness of the metal pigment particle layer 50 in the obtained metallic layer will be greater than the surface roughness of the metal pigment particle layer in the metallic layer of the present disclosure. As a result, the incident light becomes more likely to scatter by the metal pigment particle layer 50 in the metallic layer 20, and, therefore, a good metallic gloss may be difficult to obtain, or a phase difference in reflected light and scattered light can occur. Thus, it is considered that, for example, if the gloss of the outermost surface is low, a dark dot failure in appearance and the like will easily occur.

Figure 3B:
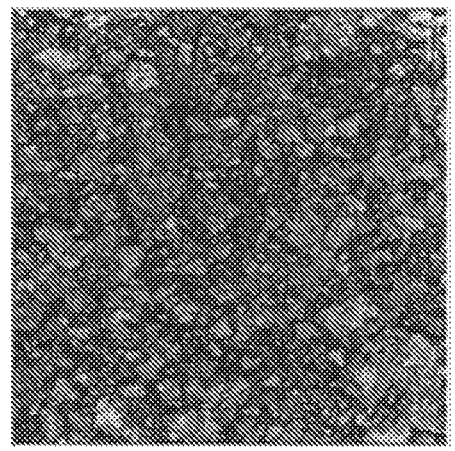
FIG. 3(b) is a laser micrograph (magnification: 50 times) of a metallic layer in the laminate of Comparative Example 2.
Figure 3A:
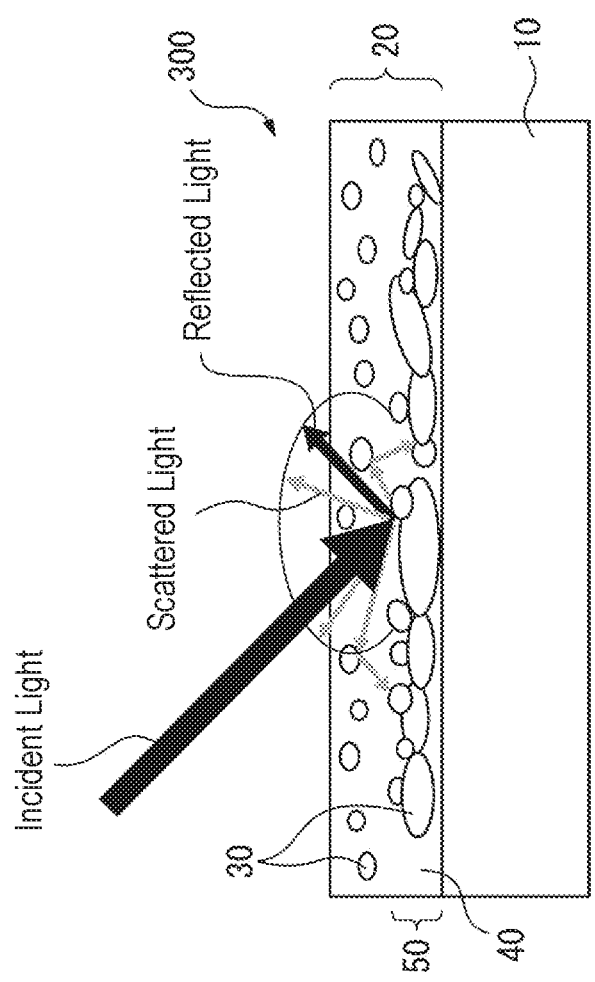
FIG. 3(a) is a diagram schematically illustrating a cross section of a laminate of Comparative Example 2.

FIG. 3(a) is a model diagram of a case where metal pigment particles having a wider particle size distribution than that of the metal pigment particles of the present disclosure and containing a large amount of particles having a small particle diameter. In this case, it is inferred that the metal pigment particles with a large particle diameter, which may contribute most to metallic gloss, settle on a lower side of the layer and the metal pigment particles with a small particle diameter are disposed on an upper side of the layer. As a result, it is considered that, since some of the light reflected by the large particle diameter metal pigment particles on the lower side will be backscattered and dimmed by the small particle diameter metal pigment particles located on the upper side, no good metallic gloss can be obtained. On the other hand, it is inferred that the metal pigment particles of the present disclosure can be disposed so as to be uniformly aligned in the flow direction without gaps at a position above large particle diameter particles and below small particle diameter particles, as the metal pigment particles of the present disclosure have a relatively narrow particle size distribution and contain a large amount of medium particle diameter particles. Although small particle diameter particles are present also in the metal pigment particles of the present disclosure, it is inferred that some of such small particle diameter particles are blocked by the metal pigment particle layer 50 located at an intermediate position of the metallic layer and cannot be moved upward, as illustrated in FIG. 1. As a result, it is believed that such a configuration is less affected by backscattering by small particle diameter particles as compared to the configuration illustrated in FIG. 3, and thus that the metallic layer of the present disclosure can exhibit a good metallic gloss.

Figure 5B:
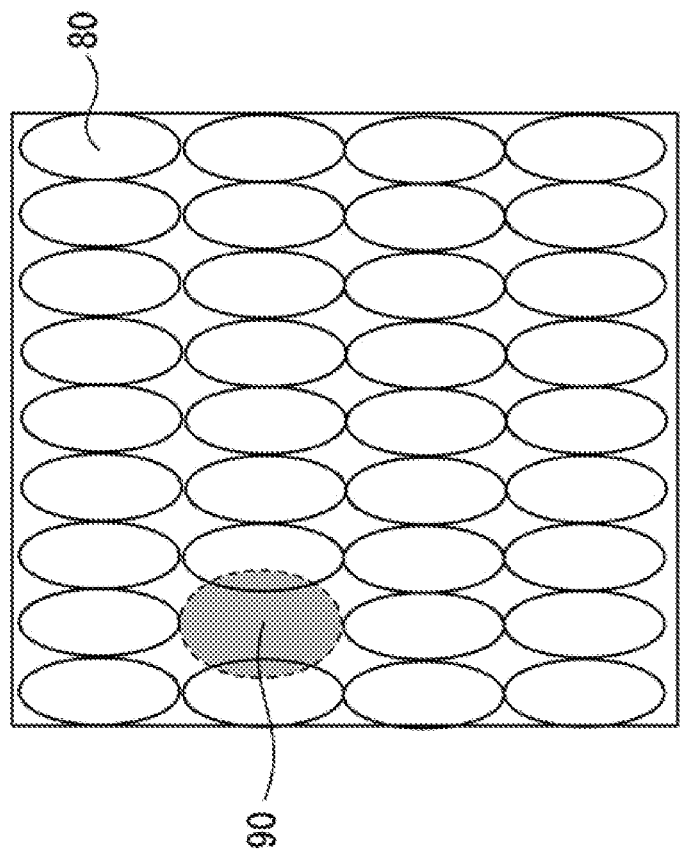
FIG. 5(b) is a schematic diagram illustrating a state in which metal pigment particles larger than the metal pigment particles of the present disclosure have fallen out in a metallic layer formed using the particles.
Figure 5A:
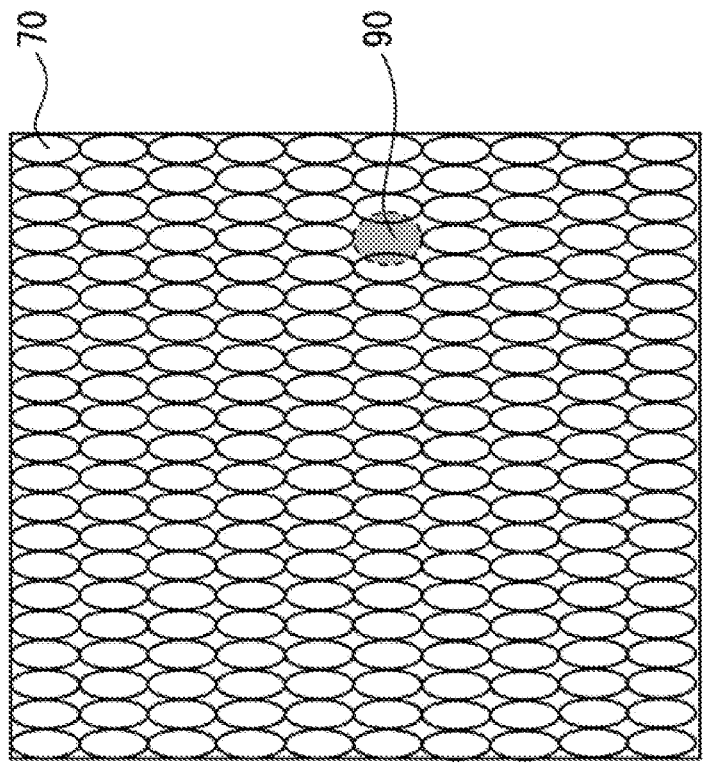
FIG. 5(a) is a schematic diagram illustrating a state in which metal pigment particles of the present disclosure have fallen out in a metallic layer formed using the metal pigment particles.

Furthermore, since the metallic layer of the present disclosure is formed by using metal pigment particles and a binder, appearance failure caused by cracking can be reduced or prevented as compared to a metal vapor deposition layer formed by vapor deposition. In addition, the metal pigment particles of the present disclosure have a relatively narrow particle size distribution and contain a large amount of medium particle diameter particles. The use of such particles can contribute to reducing or preventing the appearance failure of the metallic layer. This will be described with reference to FIG. 5. For example, a location 90 where the metal pigment particles have fallen out, in the metal pigment particle layer, does not exhibit the reflective performance of light, and, therefore, the layer located below the metal pigment particle layer may be visible. In both of the configurations illustrated in FIGS. 5(*a*) and 5(*b*), metal pigment particles at one location have fallen out. As illustrated in FIG. 5(*b*), when metal pigment particles 80 having a relatively narrow particle size distribution and containing particles with a large particle diameter are used, the region exhibiting no reflective performance of light, which is associated with the location 90 where the particles have fallen out, is larger than that illustrated in FIG. 5(*a*). As a result, the layer located below the metal pigment particle layer becomes easily visible, and may be identified as an appearance failure portion that does not exhibit metallic gloss. On the other hand, the metal pigment particles of the present disclosure use metal pigment particles having a relatively narrow particle size distribution and containing a large amount of particles with a medium particle diameter. As a result, as illustrated in FIG. even if some of metal pigment particles 70 have fallen out, the region that does not exhibit the reflective performance of light is very small, and the layer located below the metal pigment particle layer is less visible than in the case of FIG. 5(*b*), and thus is less likely to be identified as an appearance failure portion. This tendency becomes more pronounced as the number of metal pigment particles that have fallen out increases. In addition, because the location where the metal pigment particles have fallen out does not exhibit the reflective performance of light, the L value tends to be lower in the configuration of FIG. 5(*b*).

The metallic design (sometimes referred to simply as "metallic glossiness") provided by the metallic layer can be evaluated by a metallic glossiness test based on lightness (L* value) which will be described below. The metallic layer of the present disclosure may exhibit an L* value of approximately 85 or greater, approximately 86 or greater, approximately 87 or greater, approximately 88 or greater, approximately 89 or greater, approximately 90 or greater, or approximately 91 or greater. The upper limit of the L* value is not particularly limited, and can be, for example, approximately 95% or less, approximately 94% or less, or approximately 93% or less.

The metal pigment particles of the present disclosure have a particle diameter D50 of from approximately 5 to approximately 25 micrometers and a particle diameter D90 of from approximately 10 to approximately 30 micrometers. From the perspective of metallic glossiness and preventing appearance failure, D50 is preferably approximately 6 micrometer or greater, approximately 7 micrometers or greater, approximately 8 micrometers or greater, or approximately 9 micrometers or greater, and preferably approximately 23 micrometers or less, approximately 20 micrometers or less, approximately 18 micrometers or less, or approximately 15 micrometers or less. From the perspective of metallic glossiness and preventing appearance failure, D90 is preferably approximately 12 micrometer or greater, approximately 13 micrometers or greater, approximately 14 micrometers or greater, or approximately 15 micrometers or greater, and preferably approximately 28 micrometers or less, approximately 25 micrometers or less, approximately 23 micrometers or less, or approximately 20 micrometers or less.

From the perspective of metallic glossiness and preventing appearance failure, the particle diameter D10 of the metal pigment particles of the present disclosure is preferably from approximately 1 to approximately 15 micrometers. D10 is more preferably approximately 2 micrometer or greater, approximately 3 micrometers or greater, approximately 4 micrometers or greater, or approximately 5 micrometers or greater, and more preferably approximately 14 micrometers or less, approximately 13 micrometers or less, approximately 12 micrometers or less, approximately 11 micrometers or less, or approximately 10 micrometers or less.

From the perspective of metallic glossiness and preventing appearance failure, the particle diameter D30 of the metal pigment particles of the present disclosure is preferably from approximately 3 to approximately 21 micrometers. D30 is more preferably approximately 4 micrometer or greater, approximately 5 micrometers or greater, approximately 6 micrometers or greater, or approximately 7 micrometers or greater, and more preferably approximately 20 micrometers or less, approximately 19 micrometers or less, approximately 18 micrometers or less, approximately 17 micrometers or less, approximately 16 micrometers or less, or approximately 15 micrometers or less.

From the perspective of metallic glossiness and preventing appearance failure, the metal pigment particles of the present disclosure more preferably satisfy Equation 1:

$$(D90-D50) < \text{approximately } 14 \qquad \text{Equation 1}$$

Further, Equation 1 is preferably approximately 13 or less, approximately 12 or less, approximately 11 or less, or approximately 10 or less. The lower limit of Equation 1 is not particularly limited and, for example, can be approximately 1 or greater, approximately 2 or greater, or approximately 3 or greater.

The particle diameters (D10, D30, D50, and D90) of the metal pigment particles are values measured by using a laser diffraction scattering particle diameter distribution measuring device "Microtrac MT 3300 EX II series" available from MicrotracBEL Corp. under measurement conditions in accordance with JIS Z 8825: 2013.

The shape of the metal pigment particles is not particularly limited, and examples thereof include a scale-like shape, a flat shape, and a plate-like shape. Among these, a scale-like shape is preferred from the perspective of metallic glossiness.

Metal pigment particles having this shape can also be defined by the thickness of the metal pigment particles.

From the perspective of metallic glossiness, the thickness of the metal pigment particles is preferably smaller, and specifically, is preferably approximately 0.10 micrometers or less, or approximately 0.09 micrometers or less. The lower limit of the thickness of the metal pigment particles is not particularly limited, and, for example, can be approximately 0.01 micrometers or greater, approximately 0.03 micrometers or greater, approximately 0.05 micrometers or greater, or approximately 0.07 micrometers or greater. Here, the thickness of the metal pigment particles means an average thickness determined by Equation 2:

$$\text{Average thickness (µm) of metal pigment particles} = 10{,}000/(\text{density (g/cm}^3\text{) of metal pigment particles} \times \text{water surface diffusion area (cm}^2\text{/g)}) \quad \text{Equation 2}$$

The water surface diffusion area in Equation 2 can be measured in accordance with the JIS method (JIS K5906: 1998).

The material for the metal pigment particles is not particularly limited, and examples thereof include metals such as aluminum, chromium, nickel, tin, titanium, copper, gold, silver, and brass, as well as alloys or compounds containing these metals. Among these, from the perspective of metallic glossiness, the metal pigment particles preferably contain aluminum. These materials can be used alone, or in combination of two or more. One type or a combination of two or more types of metal pigment particles can be used as the metal pigment particles blended in the metallic layer and the metallic coating composition.

The metal pigment particles of the present disclosure have a relatively narrow particle size distribution and contain a large amount of medium particle diameter particles, and thus are easily oriented uniformly in a direction substantially parallel to the substrate in the metallic layer. As a result, the relatively smooth metal pigment particle layer 50 containing metal pigment particles, as illustrated in FIG. 1, can be formed. The smoothness of the metal pigment particle layer can be evaluated by a surface roughness test using a laser microscope which will be described below. The roughness (Ra) of the metal pigment particle layer in the metallic layer of the present disclosure can be approximately 2.0 micrometers or less, approximately 1.8 micrometers or less, approximately 1.5 micrometers or less, approximately 1.3 micrometers or less, approximately 1.0 micrometers or less, or approximately 0.9 micrometers or less. The lower limit of the roughness is not particularly limited and, for example, can be approximately 0.1 micrometers or greater, approximately 0.2 micrometers or greater, approximately 0.3 micrometers or greater, approximately 0.4 micrometers or greater, approximately 0.5 micrometers or greater, approximately 0.6 micrometers or greater, approximately 0.7 micrometers or greater, or approximately 0.8 micrometers or greater. The smoothness of the metal pigment particle layer can contribute to metallic glossiness and reduction of appearance failure.

The content of the metal pigment particles can be, for example, approximately 2 mass % or greater, approximately 3 mass % or greater, or approximately 4 mass % or greater, and can be approximately 20 mass % or less, approximately 18 mass % or less, approximately 15 mass % or less, approximately 13 mass % or less, or approximately 10 mass % or less, with respect to the total weight of the metallic layer. When the content of the metal pigment particles is within such a range, a metallic layer having excellent metallic glossiness and rigidity can be obtained.

The metallic layer of the present disclosure contains a binder. The binder is not particularly limited, and examples thereof include a resin having a urethane bond, a (meth)acrylic resin, an epoxy resin, a phenol resin, a polyvinyl alcohol, a vinyl acetate resin, a silicone resin, a vinyl chloride resin, and a vinyl chloride-vinyl acetate copolymer. The binder can be used alone, or in combination of two or more. In the present disclosure, the term "resin having a urethane bond" may include, for example, a resin prepared using at least one selected from urethane (meth)acrylate and urethane (meth)acrylate oligomer, and the urethane resin can also include a (meth)acrylic urethane resin, and the like.

Among these, a vinyl chloride-vinyl acetate copolymer is indicated as a suitable binder. The vinyl chloride-vinyl acetate copolymer may include other polymerized units such as vinyl alcohol units, olefin units (e.g., ethylene units), maleic acid units, and hydroxyalkyl acrylic acid ester units. Specific examples of such binder resins include SOLBIN (registered trademark) C, SOLBIN (registered trademark) CL, SOLBIN (registered trademark) CNL (vinyl chloride-vinyl acetate copolymer resins; Nisshin Chemical Industry Co., Ltd.), SOLBIN (registered trademark) A, SOLBIN (registered trademark) AL (vinyl chloride-vinyl acetate-vinyl alcohol copolymer resins; Nisshin Chemical Industry Co., Ltd.), UCAR (registered trademark) Solution Vinyl Resin VYHH (vinyl chloride-vinyl acetate copolymer resin, Dow-Chemical Japan Co., Ltd.), UCAR (registered trademark) Solution Vinyl Resin VAGH (vinyl chloride-vinyl acetate-vinyl alcohol copolymer resin; Dow-Chemical Japan Co., Ltd.), UCAR (registered trademark) Solution Vinyl Resin VMCH (vinyl chloride-vinyl acetate-maleic acid copolymer resin; Dow-Chemical Japan Co., Ltd.), UCAR (registered trademark) Solution Vinyl Resin VMCC (vinyl chloride-vinyl acetate-maleic acid copolymer resin; Dow Chemical Japan Limited), UCAR (registered trademark) Solution Vinyl Resin VMCA (vinyl chloride-vinyl acetate-maleic acid copolymer resin; Dow Chemical Japan Limited), UCAR (registered trademark) Solution Vinyl Resin VROH (vinyl chloride-vinyl acetate-hydroxyalkyl acrylic acid ester copolymer resin; Dow Chemical Japan Limited), and VINNOL E15/45 (vinyl chloride-vinyl acetate copolymer resin; Wacker Chemie AG).

The content of the binder can be, for example, approximately 20 mass % or greater, approximately 30 mass % or greater, approximately 40 mass % or greater, approximately 50 mass % or greater, approximately 60 mass % or greater, approximately 70 mass % or greater, approximately 75 mass % or greater, or approximately 80 mass % or greater, and can be approximately 98 mass % or less, approximately 95 mass % or less, approximately 90 mass % or less, or approximately 85 mass % or less, with respect to the total weight of the metallic layer.

The metallic layer of the present disclosure may contain, as other optional components, additives such as fillers other than the metal pigment particles, UV absorbing agents, light stabilizers, heat stabilizers, dispersants, plasticizers, flow improvers, leveling agents, pigments other than the metal pigment particles, dyes, and fragrances. These additives can be used alone, or in combination of two or more types thereof. An amount of each of these additives to be blended and a total amount of these additives to be blended can be determined in a range where the characteristics required of the metallic layer are not impaired.

The metallic coating composition of the present embodiment to form the metallic layer can contain various materials that can be used in the metallic layer described above, and contains at least metal pigment particles having a particle diameter D50 of from approximately 5 to approximately 25 micrometers and a particle diameter D90 of from approximately 10 to approximately 30 micrometers and a binder precursor. Here, the term "binder precursor" refers to a component that ultimately becomes a binder in the metallic layer, and examples thereof include a curable or crosslinkable monomer and/or a curable or crosslinkable oligomer, a resin that is cured or crosslinked in advance, and a noncurable or non-crosslinkable resin such as a thermoplastic resin. Thus, the metallic coating composition can contain additives such as a crosslinking agent and a curing agent, as optional components. A metallic coating composition containing a crosslinking agent can be referred to as a crosslinking composition, and a metallic coating composition containing a curing agent can be referred to as a curable composition.

The metallic coating composition is preferably used in such an application that the metallic coating composition is applied onto a substrate while shear is applied to a surface of the metallic coating composition, an example of such an application includes at least one kind of method selected from a knife coater, a die coater, a roll coater, a bar coater, a cast coater, a notch bar coater, a gravure coater, and a rod coater. When the metallic coating composition is used this way, the resulting metallic layer exhibits excellent metallic glossiness while appearance failure is reduced.

The content of the metal pigment particles in the metallic coating composition can be approximately 2 parts by mass or greater, approximately 3 parts by mass or greater, or approximately 4 parts by mass or greater, and can be approximately 20 parts by mass or less, approximately 18 parts by mass or less, approximately 15 parts by mass or less, approximately 13 parts by mass or less, or approximately 10 parts by mass or less, based on 100 parts by mass of the solid content of the metallic coating composition. When the content of the metal pigment particles is within such a range, a metallic layer having excellent metallic glossiness and rigidity can be obtained.

The content of the binder precursor in the metallic coating composition can be approximately 20 parts by mass or greater, approximately 30 parts by mass or greater, approximately 40 parts by mass or greater, approximately 50 parts by mass or greater, approximately 60 parts by mass or greater, approximately 70 parts by mass or greater, approximately 75 parts by mass or greater, or approximately 80 parts by mass or greater, and can be approximately 98 parts by mass or less, approximately 95 parts by mass or less, approximately parts by mass or less, or approximately 85 parts by mass or less, based on 100 parts by mass of the solid content of the metallic coating composition.

The various additives as the optional components described above can be appropriately blended within a range where the characteristics required of the metallic layer obtained by the subject metallic coating composition are not impaired. In order to improve workability, coating properties, and the like, the metallic coating composition can optionally contain an organic solvent such as toluene and an aqueous dispersion medium. As the aqueous dispersion medium, for example, distilled water, purified water, ion-exchanged water, and tap water can be used. In a range that does not affect the effect of the present invention, water soluble alcohols such as ethanol may be used in combination with such water.

A method of forming a decorative laminate using a metallic coating composition advantageously includes a step of applying the metallic coating composition onto a substrate, while applying shear to a surface of the metallic coating composition, for forming a metallic layer, as illustrated in FIG. 4, from the perspective of the orientation of the metal pigment particles and the metallic glossiness associated therewith.

In the formation of the metallic layer, as necessary, an additional process such as drying, thermosetting, and ionizing radiation curing can be appropriately applied. As the additional process, a combination of one or more types or two or more types can be employed.

Examples of a shear applying method can include a knife coater, a die coater, a roll coater, a bar coater, a cast coater, a notch bar coater, a gravure coater, and a rod coater. These methods can be used alone, or in combination of two or more types. Here, a spraying method, which is a type of common coating method, does not correspond to this shear applying method. In the spraying method, shear is applied to droplets at the moment when a coating agent is discharged, but no shear is applied to the droplets after discharge. In the spraying method, droplets are typically discharged from a position perpendicular to the substrate surface and landed onto the substrate surface, and thus the metal pigment particles in the droplets after landing are likely to be oriented randomly. As a result, the metallic layer obtained by the spraying method cannot exhibit metallic gloss as in the present disclosure.

The viscosity of the metallic coating composition can be appropriately set so as to achieve the desired metallic glossiness and film thickness according to the shear applying method employed.

The thickness of the metallic layer can be approximately 1 micrometer or greater, approximately 3 micrometers or greater, approximately 4 micrometers or greater, approximately 5 micrometers or greater, approximately 6 micrometers or greater, approximately 8 micrometers or greater, or approximately 10 micrometers or greater, and can be approximately 50 micrometers or less, approximately 40 micrometers or less, approximately 30 micrometers or less, approximately 20 micrometers or less, or approximately micrometers or less. Here, in the present disclosure, the thickness of the metallic layer refers to the thickness of the thickest portion, i.e. the maximum thickness. The maximum thickness is an average value of a value measured at 5 locations or more, and preferably 10 locations, using a micrometer (model number: ID-C112XB) available from Mitutoyo Corporation, in accordance with JIS K6783.

The substrate constituting the laminate of the present disclosure is not particularly limited, and for example, an organic substrate containing at least one selected from the group consisting of a polyvinyl chloride resin, a polyurethane resin, a polyolefin resin, a polyester resin, a vinyl chloride-vinyl acetate resin, a polycarbonate resin, a (meth) acrylic resin, a cellulose resin, and a fluororesin can be used. As the substrate, a paper substrate, an inorganic substrate such as glass, or a metal substrate such as aluminum can also be used.

The shape or configuration of the substrate is not particularly limited as long as shear is applied to the surface of the metallic coating composition applied: it can be, for example, film shape, plate shape, curved surface shape, deformed shape, or three-dimensional shape, and it can also be single-layer configuration, laminated configuration, or composite configuration such as in which plural substrates in different shapes are combined. One or both sides of the substrate may have releasing performance. Such releasing performance can be imparted by, for example, performing a release treatment with a release agent such as silicone to form a release layer on the surface of the substrate. By using a substrate having such releasing performance, it is also possible to obtain a decorative laminate that does not have a substrate. For example, a decorative laminate having no substrate can be obtained by: forming a metallic layer on a substrate surface having releasing performance; forming another layer such as an adhesive layer on a metallic layer surface on a side opposite to the substrate; and then releasing the substrate having releasing performance.

The substrate may be colored or colorless. The substrate may be opaque, translucent or transparent. The substrate may include a substantially smooth surface and may include a structured surface that can be formed by surface processing such as embossing.

In an embodiment, the substrate includes a transparent resin layer and a colored resin layer, for example, a transparent polyvinyl chloride resin layer and a colored polyvinyl chloride resin layer. In the laminate of this embodiment, the colored resin layer is supported or protected by the transparent resin layer, and thus durability can be imparted to the decorative characteristics of the laminate. For example, the laminate of this embodiment can be used suitably for attaching to an interior material or an exterior material of a structure or a vehicle.

The thickness of the substrate can be approximately 25 micrometer or grater, approximately 50 micrometer or grater, or approximately 80 micrometer or grater, and can be approximately 5 mm or less, approximately 1 mm or less, and approximately 0.5 mm or less.

In some embodiments, a stretchable substrate is used as the substrate. The tensile elongation ratio of the stretchable substrate can be approximately 10% or greater, approximately 20% or greater, or approximately 30% or greater, and can be approximately 400% or less, approximately 350% or less, or approximately 300% or less. The tensile elongation ratio of the stretchable substrate is a value calculated by preparing a sample having a width of 25 mm and a length of 150 mm and stretching the sample until the sample is broken using a tensile tester at a temperature of 20° C., a tensile test speed of 300 mm/min, and a grip spacing of 100 mm, using the equation: [grip spacing at the time of breaking (mm)–grip spacing before the stretching (mm) (=100 mm)]/grip spacing before the stretching (mm) (=100 mm)×100 (%).

In some embodiments, the decorative laminate of the present embodiment includes additional layers such as a surface layer, a colored layer, a decorative layer, a glittering layer other than the metallic layer, a bonding layer (primer layer), an adhesive layer, and a release liner, for example, on the metallic layer, under the metallic layer, between the metallic layer and the substrate, or on the substrate surface on the side opposite to the metallic layer. These additional layers can be used alone or in combination of two or more types thereof, and can be applied to the entire surface or a part of the laminate. The additional layer may have a three-dimensional shape such as an emboss pattern on its surface.

A generally used adhesive, which can be classified into a solvent-type, emulsion-type, pressure-sensitive type, heat-sensitive type, or heat-curable or radiation-curable type (for example, ultraviolet-curable type) adhesive, which include acrylics, polyolefins, polyurethanes, polyesters, and rubbers, can be used as the adhesive layer. The thickness of the adhesive layer is not limited to the following and, for example, 5 micrometers or greater, approximately 10 micrometers or greater, or approximately 20 micrometers or greater, and can be approximately 100 micrometers or less, approximately 80 micrometers or less, or approximately 50 micrometers or less.

For example, a release liner may be imparted to a surface of the adhesive layer. Examples of the release liner include papers, plastic materials such as polyethylenes, polypropylenes, polyesters, and cellulose acetates, and papers coated with such plastic materials. These liners may have a surface that has been subjected to release treatment with a release agent such as silicone. The thickness of the release liner, generally, can be approximately 5 micrometers or greater, approximately 15 micrometers or greater, or approximately 25 micrometers or greater, and can be approximately 500 micrometers or less, approximately 300 micrometers or less, or approximately 250 micrometers or less.

The decorative laminate of the present embodiments may be, for example, a sheet-like article, a rolled body winded in a roll shape or an article with a three-dimensional shape.

For example, the decorative laminate of the present disclosure can be used as interior materials (e.g., for walls, stairs, ceilings, pillars, and partitions) in building structures such as buildings, condominiums, and houses, or in elevators and the like used in such building structures, or exterior materials for outer walls; can be used as interior or exterior materials for various vehicles such as railroad vehicles, ships, airplanes, and automobiles including two-wheeled and four-wheeled vehicles; and can also be used as surface materials for all kinds of articles such as road signs, signboards, furniture, and electrical appliances.

EXAMPLES

In the following examples, specific embodiments of the present disclosure will be illustrated, but the present invention is not limited to these examples. All 'part' and 'percent' are based on mass unless otherwise specified. A numerical value essentially includes an error originated from a measurement principle and a measuring device. The numerical value is generally indicated by a significant digit that is rounded.

The metal pigment particles used in the examples are shown in Table 1 below. The term "particle size distribution: large" in the table is intended to have a larger particle size distribution than that of Z-465 and "particle size distribution: small" is intended to have a particle size distribution equivalent to that of Z-465.

TABLE 1

| Product name, Model number, or Abbreviated name | Description | Available from |
| --- | --- | --- |
| 54-452 | Scale-like aluminum pigment particles, solid content: 71.0%, particle size distribution: large (D10: 18 µm; D30: 28 µm; D50: 33 µm; D90: 55 µm) | Toyo Aluminium K.K. |
| 1200 MH | Scale-like aluminum pigment particles, solid content: 64.0%, particle size distribution: large (D10: 6 µm; D30: 11 µm; D50: 17 µm; D90: 38 µm) | Toyo Aluminium K.K. |

TABLE 1-continued

| Product name, Model number, or Abbreviated name | Description | Available from |
|---|---|---|
| Z-440 | Scale-like aluminum pigment particles, solid content: 70.0%, particle size distribution: small (D10: 8 μm; D30: 11 μm; D50: 12 μm; D90: 19 μm) | Toyo Aluminium K.K. |
| Z-465 | Scale-like aluminum pigment particles, solid content: 70.0%, particle size distribution: small (D10: 6 μm; D30: 8 μm; D50: 10 μm; D90: 17 μm), thickness: 0.14 μm | Toyo Aluminium K.K. |
| Z-510 | Scale-like aluminum pigment particles, solid content: 70.5%, particle size distribution: small (D10: 16 μm; D30: 21 μm; D50: 24 μm; D90: 32 μm) | Toyo Aluminium K.K. |
| Pigment Particle A | Scale-like aluminum pigment particles, solid content: 59.5% particle size distribution: small (D10: 6 μm; D30: 8 μm; D50: 10 μm; D90: 17 μm), thickness: 0.09 μm | — |

Preparation of Metallic Coating Compositions (MC1)

Components were mixed in the blending proportions listed in Table 2 to prepare a metallic coating composition (MC1). Here, each numerical value in parentheses shown in Table 2 refers to the number of grams when each material used is converted in terms of solid content, and each numerical value other than the numerical value in parentheses refers to the parts by mass of each material used. In addition, each vinyl chloride-vinyl acetate-vinyl alcohol solution in Table 2 was prepared by collecting 58.5 parts by mass of a vinyl chloride-vinyl acetate copolymer (glass transition temperature (Tg)=70° C., number average molecular weight (Mn)=$3.6\times10^4$), 19.5 parts by mass of vinyl chloride-vinyl acetate-vinyl alcohol (Tg=76° C., Mn=$3.5\times10^4$), 12.2 parts by mass of a plasticizer, and 9.8 parts by mass of a thermal stabilizer, and adding them to a solvent containing methyl isobutyl ketone, xylene, and cyclohexane. The solid content of the solution was 34.3% and the viscosity was 1,500 cps. Metal pigment particles were dispersed in this vinyl chloride-vinyl acetate-vinyl alcohol solution to obtain a metallic coating composition (MC1).

Preparation of Metallic Coating Compositions (MC2 to 10)

Metallic coating compositions (MC2 to 10) were each prepared in the same manner as for MC1 except that the composition and amounts of the components blended were changed to those shown in Table 2.

Example 1

The metallic coating composition (MC1) was applied onto a 50 micrometer-thick PET film substrate (Tetron (trademark) Film G2, available from Toyobo Film Solutions Limited) using a knife coater. The coating layer was dried for 1.5 minutes at 65° C. and for 2 minutes at 155° C. to produce a laminate having a 23 micrometer-thick metallic layer.

Comparative Example 1

A laminate of Comparative Example 1 was produced in the same manner as in Example 1 except that the metallic coating composition was changed to MC2.

Comparative Example 2

A laminate of Comparative Example 2 was produced in the same manner as in Example 1 except that the metallic coating composition was changed to MC3.

Example 2

A laminate of Example 2 was produced in the same manner as in Example 1 except that the metallic coating composition was changed to MC4.

Comparative Example 3

A laminate of Comparative Example 3 was produced in the same manner as in Example 1 except that the metallic coating composition was changed to MC5.

TABLE 2

| | Metallic coating composition (g) | | | | | | | | | |
|---|---|---|---|---|---|---|---|---|---|---|
| | MC1 | MC2 | MC3 | MC4 | MC5 | MC6 | MC7 | MC8 | MC9 | MC10 |
| Vinyl chloride-vinyl acetate-vinyl alcohol solution | 97.7(33.5) | 92.8(31.8) | 95.2(32.7) | 97.4(33.4) | 96.9(33.2) | 95.2(32.7) | 93.0(31.9) | 90.9(31.2) | 93.0(31.9) | 97.7(33.5) |
| Z-465 | 2.3(1.6) | — | — | — | — | 4.8(3.4) | 7.0(4.9) | 9.1(6.4) | — | — |
| 54-452 | — | 7.2(5.0) | — | — | — | — | — | — | — | — |
| 1200 MH | — | — | 4.8(3.4) | — | — | — | — | — | — | — |
| Z-440 | — | — | — | 2.6(1.8) | — | — | — | — | — | — |
| Z-510 | — | — | — | — | 3.1(2.2) | — | — | — | — | — |
| Pigment Particle A | — | — | — | — | — | — | — | — | 7.0(4.2) | 4.8(2.9) |

Comparative Example 4

The metallic coating composition (MC1) was dropped by its own weight from a position 10 cm above a 50 micrometer-thick PET film substrate (Tetron (trademark) Film G2, available from Toyobo Film Solutions Limited) so as not to apply shear thereto, and then dried for 1.5 minutes at 65° C. and for 2 minutes at 155° C. to produce a laminate having a 24 micrometer-thick metallic layer.

Example 3

A laminate of Example 3 was produced in the same manner as in Example 1 except that the metallic coating composition was changed to MC6.

Example 4

A laminate of Example 4 was produced in the same manner as in Example 1 except that the metallic coating composition was changed to MC7.

Example 5

A laminate of Example 5 was produced in the same manner as in Example 1 except that the metallic coating composition was changed to MC8.

Example 6

A laminate of Example 6 was produced in the same manner as in Example 1 except that the metallic coating composition was changed to MC9.

Example 7

A laminate of Example 7 was produced in the same manner as in Example 1 except that the metallic coating composition was changed to MC10.

Example 8

The metallic coating composition (MC1) was applied onto a PET film substrate having releasing performance using a knife coater. The coating layer was dried for 1.5 minutes at 65° C. and for 2 minutes at 155° C., and a laminate A having a 23 micrometer-thick metallic layer was obtained.

Onto the metallic layer of laminate A, a 135 micrometer-thick transparent polyvinyl chloride resin film (calendar film formation, polyvinyl chloride/ester-based plasticizer/organic stabilizer (acrylic resin, zinc stearate)=79/16/5 (mass ratio)) was applied. After the metallic layer and the transparent polyvinyl chloride resin film were heat laminated so that the transparent polyvinyl chloride resin film was in contact with an embossing roll having a flat, satin-like emboss pattern, and then the PET film substrate was peeled off, and a laminate B was obtained. The heat lamination was performed under the following conditions:

IR temperature: 600° C.
Nip pressure: 0.2 MPa
Embossing roll temperature: 60° C.
Takeoff roll temperature: 170° C.
Heat drum temperature: 130° C.

An acrylic adhesive was then applied onto a paper release liner and dried to obtain a laminate C having a 38 micrometer-thick adhesive layer.

The adhesive layer of the laminate C was applied to the metallic layer of the laminate B to obtain a laminate of Example 8.

Physical Property Evaluation Tests

The properties of each of the laminates were evaluated by the following tests. The results are shown in Table 4.

Metallic Glossiness Test: Lightness L* Value

Three positions were freely chosen for the metallic layer of the laminate, and the lightness L* value in the CIE1976 L*a*b* (CIELAB) chromaticity coordinates was measured for each of the selected portions, and an average value thereof was calculated. For the measurement of lightness, a spectrophotometric colorimeter (CM-3700A) available from Konica Minolta, Inc. was used, and the measurement range was defined within a circle with a diameter of 25.4 mm which was in the range of field of view of the color difference meter.

Surface Roughness Test: Ra Value

The laminate was fixed on a substantially smooth aluminum plate so that the metallic layer was on the upper side. The surface roughness (Ra) of the metallic layer was measured for freely chosen 5 positions with a 50× objective lens using a laser microscope (OPTELICS (trademark) HYBRID, available from Lasertec Corporation), and an average value thereof was calculated.

Figure 6B:
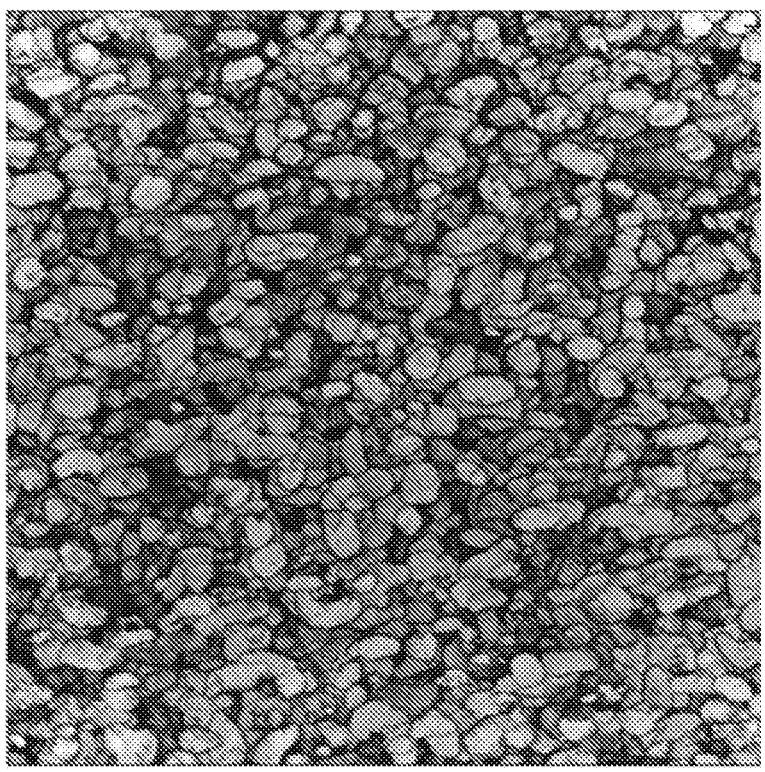
FIG. 6(b) is a laser micrograph (magnification: 50 times) of the metallic layer in the laminate of Example 1 produced by a shear-applying method.
Figure 6A:
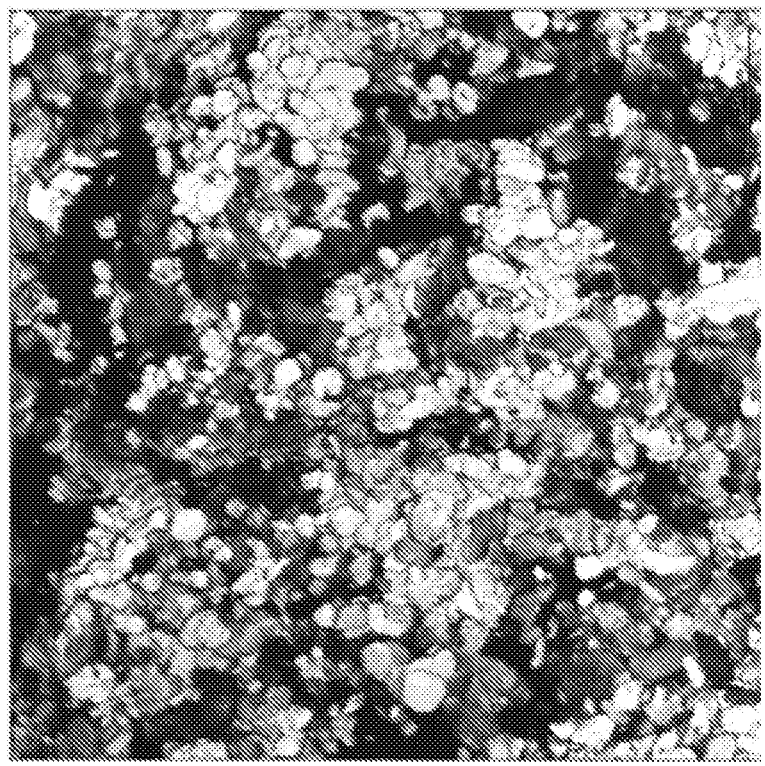
FIG. 6(a) is a laser micrograph (magnification: 50 times) of a metallic layer in a laminate of Comparative Example 4 produced by a shear-free method.

The photo images in FIGS. 1(b) (Example 1), 2(b) (Comparative Example 1) and 3(b) (Comparative Example 2) and FIGS. 6(a) (Comparative Example 4) and 6(b) (Example 1) are photo images of the metallic layers recorded during this test.

Appearance Test

The laminate was illuminated with a white fluorescent lamp so that an illuminance of the surface portion of the metallic layer was 400 lux, and the metallic layer was visually observed from a position 50 cm apart upward from the metallic layer. At the surface of the metallic layer, a case where the appearance failure portion was not visually recognized at all was evaluated as "good", a case where the appearance failure portion was slightly visually recognized was evaluated as "acceptable", and a case where the appearance failure portion was clearly visually recognized was evaluated as "poor". Here, the term "appearance failure portion" refers to a location that does not exhibit metallic gloss.

TABLE 3

| | Metal pigment particles | | | | | | | | |
|---|---|---|---|---|---|---|---|---|---|
| | Particle diameter distribution | D10 (μm) | D30 (μm) | D50 (μm) | D90 (μm) | Thickness (μm) | Shear when coated | Lightness L* value | Roughness Ra (μm) | Appearance |
| Example 1 | Small | 6 | 8 | 10 | 17 | 0.14 | Yes | 88 | 1.4 | Good |
| Comparative Example 1 | Large | 18 | 28 | 33 | 55 | Not measured | Yes | 87 | 2.8 | Poor |
| Comparative Example 2 | Large | 6 | 11 | 17 | 38 | Not measured | Yes | 83 | 1.1 | Good |
| Example 2 | Small | 8 | 11 | 12 | 19 | Not measured | Yes | 89 | 1.4 | Acceptable |
| Comparative Example 3 | Small | 16 | 21 | 24 | 32 | Not measured | Yes | 90 | 1.3 | Poor |
| Comparative Example 4 | Small | 6 | 8 | 10 | 17 | 0.14 | No | 79 | 2.1 | Poor |
| Example 3 | Small | 6 | 8 | 10 | 17 | 0.14 | Yes | 89 | 1.1 | Good |
| Example 4 | Small | 6 | 8 | 10 | 17 | 0.14 | Yes | 89 | 0.8 | Good |
| Example 5 | Small | 6 | 8 | 10 | 17 | 0.14 | Yes | 90 | 0.8 | Good |
| Example 6 | Small | 6 | 8 | 10 | 17 | 0.09 | Yes | 91 | 0.6 | Good |
| Example 7 | Small | 6 | 8 | 10 | 17 | 0.09 | Yes | 91 | 0.8 | Good |
| Example 8 | Small | 6 | 8 | 10 | 17 | 0.14 | Yes | 87 | 1.6 | Good |

Figure 7:
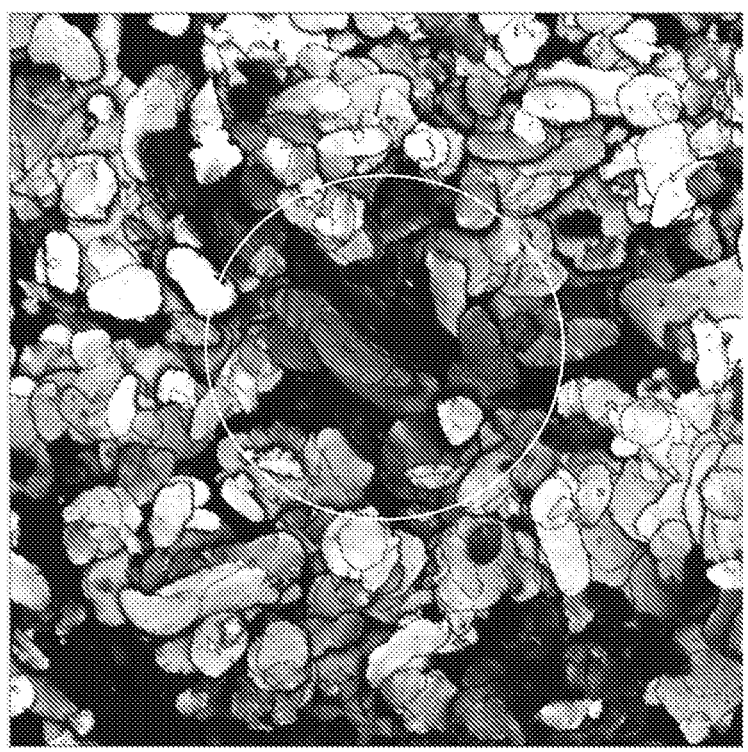
FIG. 7 is a laser micrograph (magnification: 100 times) of the metallic layer in the laminate of Comparative Example 4 produced by the shear-free method. A white circle portion indicates a region containing scale-like metal pigment particles that are oriented substantially perpendicularly to a substrate.

FIG. 7 is a photo image of the metallic layer of Comparative Example 4 taken with a 100Δ objective lens using the laser microscope described above. It could be confirmed that, when the metallic layer was formed by a shear-free method, the metal pigment particles were oriented in a random direction and were not oriented so as to be uniformly aligned in the flow direction, as is evident also from this photo image (e.g., the white circle portion), and thus that the metallic glossiness was poor.

Various variations of the above-mentioned embodiments and examples will be apparent to those skilled in the art without departing from the basic principle of the present invention. In addition, various modifications and variations of the present invention will be apparent to those skilled in the art without departing from the spirit and scope of the present invention.

REFERENCE SIGNS LIST

10 Substrate
20 Metallic layer
30 Metal pigment particles
40 Binder
50 Metal pigment particle layer
60 Bar coater
70 Metal pigment particles having medium particle diameter
80 Metal pigment particles having large particle diameter
90 Location where metal pigment particles have fallen out
100, 200, 300 Decorative laminate

The invention claimed is:

1. A decorative laminate comprising:
at least one selected from the group consisting of a substrate and a release liner; and
a metallic layer containing metal pigment particles and a binder, the metal pigment particles having a particle diameter D50 of from 5 to 25 micrometers and a particle diameter D90 of from 10 to 30 micrometers, the metallic layer having a lightness L* value in CIE1976 L*a*b* chromaticity coordinates of from 85 to 95,
wherein the metallic layer comprises a metal pigment particle layer containing the metal pigment particles, the metal pigment particle layer having a surface roughness Ra evaluated by a laser microscope of 2.0 micrometers or less, and
wherein the metal pigment particles are applied onto the substrate while shear is applied.

2. The laminate according to claim 1, wherein the metal pigment particles have a scale-like shape.

3. The laminate according to claim 1, wherein the metal pigment particles have a thickness of 0.10 micrometers or less.

4. The laminate according to claim 1, wherein the metal pigment particles contain aluminum.

5. The laminate according to claim 1, wherein the metal pigment particles satisfy Equation 1:

$$(D90-D50)<14 \quad \text{Equation 1.}$$

6. The laminate according to claim 1, wherein the metal pigment particles have a particle diameter D10 of from 1 to 15 micrometers and/or a particle diameter D30 of from 3 to 21 micrometers.

7. The laminate according to claim 1, wherein the metal pigment particles are contained in the metallic layer in an amount of from 2 to 20 mass %.

* * * * *